United States Patent [19]

Nakagawa et al.

[11] Patent Number: 5,156,796
[45] Date of Patent: Oct. 20, 1992

[54] FORMING HOLLOW PLASTIC PRODUCT PARTIALLY DIFFERENT IN COMPOSITION AND ITS MANUFACTURING APPARATUS

[75] Inventors: Tatsuya Nakagawa, Matsudo; Nobumasa Tatara, Honjyo, both of Japan

[73] Assignee: Excell Corporation, Tokyo, Japan

[21] Appl. No.: 536,056

[22] Filed: Jun. 8, 1990

Related U.S. Application Data

[63] Continuation of Ser. No. 266,537, Nov. 1, 1988, abandoned, which is a continuation of Ser. No. 58,073, Jun. 3, 1987, abandoned.

[30] Foreign Application Priority Data

Jun. 4, 1986 [JP] Japan .................. 61-128127

[51] Int. Cl.⁵ .................................... B29C 47/22
[52] U.S. Cl. .................... 264/514; 264/167; 264/173; 425/132; 425/532; 425/381
[58] Field of Search ............ 264/514, 515, 512, 173, 264/167; 425/133.1, 131.1, 462, 532, 503, 516, 132, 381; 428/35.1

[56] References Cited

U.S. PATENT DOCUMENTS

| | | | |
|---|---|---|---|
| 3,257,482 | 6/1966 | Schechter | 264/515 |
| 3,409,710 | 11/1968 | Klygis | 264/540 |
| 3,457,337 | 7/1969 | Turner | 264/515 |
| 4,056,344 | 11/1977 | Lemelson | 425/132 |
| 4,149,839 | 4/1979 | Iwawaki et al. | 425/532 |
| 4,239,474 | 12/1980 | Nakagawa | 264/542 |
| 4,659,531 | 4/1987 | Ezaki | 264/515 |

FOREIGN PATENT DOCUMENTS

| | | | |
|---|---|---|---|
| 537801 | 3/1957 | Canada | 425/131.1 |
| 47-04150 | 2/1972 | Japan | 264/515 |
| 54-22465 | 2/1979 | Japan | 264/515 |
| 58-18232 | 2/1983 | Japan | 264/515 |
| 60-21229 | 2/1985 | Japan | 264/512 |
| 61-32733 | 2/1986 | Japan | 425/131.1 |
| 1456198 | 11/1976 | United Kingdom | 264/515 |

Primary Examiner—Jeffery Thurlow
Attorney, Agent, or Firm—Skjerven, Morrill, MacPherson, Franklin & Friel

[57] ABSTRACT

A composite parison generally cylindrical in shape and including two or more plastic materials different in characteristic is formed. Using this composite parison, a hollow plastic product of any desired shape having a locally different characteristic, such as in softness, heat-resistance or wear-resistance, can be manufactured with ease, for example, by conventional blow molding.

9 Claims, 3 Drawing Sheets

Fig. 7

Compatibility table for various resins:

| | LDPE | HDPE | PP | PS | ABS | RIGID PVC | FLEXIBLE PVC | PC | PU | ACRYLIC RESIN | NYLON 6,66 | EAA | EVA | IONOMERS | SBS | CPE |
|---|---|---|---|---|---|---|---|---|---|---|---|---|---|---|---|---|
| LDPE | | ○ | | | | | | | △ | | | ○ | ○ | ○ | △ | ○ |
| HDPE | ○ | | ○ | | | | | | △ | | | ○ | ○ | ○ | △ | ○ |
| PP | | ○ | | | | | | | △ | | | △ | ○ | | ○ | △ |
| PS | | | | | ○ | | | | △ | | | | ○ | | ○ | △ |
| ABS | | | | ○ | | ○ | ○ | △ | ○ | | | | ○ | | ○ | ○ |
| RIGID PVC | | | | | ○ | | ○ | ○ | ○ | ○ | | | ○ | | ○ | ○ |
| FLEXIBLE PVC | | | | | ○ | ○ | | ○ | ○ | ○ | | | ○ | | ○ | ○ |
| PC | | | | | △ | ○ | ○ | | ○ | ○ | | | | | | ○ |
| PU | △ | △ | △ | △ | ○ | ○ | ○ | ○ | | ○ | | △ | ○ | | △ | ○ |
| ACRYLIC RESIN | | | | | | ○ | ○ | ○ | ○ | | | | | | | △ |
| NYLON 6,66 | | | | | | | | | | | | ○ | ○ | | ○ | |
| EAA | ○ | ○ | △ | | | | | | △ | | | | ○ | ○ | △ | ○ |
| EVA | ○ | ○ | ○ | ○ | ○ | ○ | ○ | | ○ | | ○ | ○ | | ○ | ○ | ○ |
| IONOMERS | ○ | ○ | | | | | | | | | | ○ | ○ | | ○ | ○ |
| SBS | △ | △ | ○ | ○ | ○ | ○ | ○ | | △ | | | △ | ○ | | | ○ |
| CPE | ○ | ○ | ○ | △ | ○ | ○ | ○ | | ○ | △ | | ○ | ○ | ○ | ○ | |

○ : EXCELLENT
△ : FAIR
NO MARK : POOR OR UNKNOWN

FORMING HOLLOW PLASTIC PRODUCT PARTIALLY DIFFERENT IN COMPOSITION AND ITS MANUFACTURING APPARATUS

This application is a continuation of application Ser. No. 07/266,337, filed Nov. 1, 1988, now abandoned which is a continuation of Ser. No. 07/058,073 filed Jun. 3, 1987 now abandoned.

BACKGROUND OF THE INVENTION

1. Field of the Invention

This invention generally relates to a blow molding method and a plastic product resulting therefrom, and, in particular, to a hollow plastic product partially different in composition and apparatus for manufacturing such a hollow plastic product. More specifically, the present invention relates to a method and apparatus for manufacturing a hollow plastic product which includes at least one section composed of a thermoplastic resin material which is different from a thermoplastic resin material forming the rest of the product, and a resulting hollow plastic product. More particularly, the present invention relates to a blow molding method and apparatus for manufacturing a hollow product which is different in composition at least partially and a resulting hollow plastic product.

2. Description of the Prior Art

It is well known to manufacture a hollow product of a desired shape by blow molding a parison extruded from a nozzle. However, in accordance with the prior art, use was made of a parison comprised of a single plastic material. Here, the single plastic material includes a uniform mixture of plastic materials, and, thus, the term "single plastic material" should be interpreted to include not only a plastic material composed of a single thermoplastic resin material, but also a plastic material which is, in fact, a mixture of two or more resin materials and which is uniform in composition. Thus, the term "single plastic material" indicates the fact that the composition is substantially uniform whether it is a mixture or not. According to the prior art technique, since use was made of a single plastic material, there was produced a plastic product which was uniform in characteristic. Thus, in order to vary the local characteristic of a resulting plastic product, the local thickness of the resulting product had to be made thinner or thicker; however, local thinning or thickening was not possible in some cases, so that the resulting product was rather limited.

It has been proposed to use a double-layer parison having two different plastic materials to manufacture a plastic product. In this case, however, each of the underlying and overlying layers is composed of a single plastic material, so that the overall characteristic of a resulting plastic product tends to be dominated by either one of the two overlying layers. Thus, applications of such a double-layer parison are also rather limited.

SUMMARY OF THE INVENTION

In accordance with the present invention, there is provided a hollow product which is manufactured by blow molding using a composite parison which differs in composition at least partly. For example, such a composite parison may be cylindrical in shape when extruded out of an extrusion nozzle and may have at least one section having a different composition than the rest. In one example, such a composite parison may have a cylindrical shape when extruded out of an extrusion nozzle and at least a portion of the composite parison is comprised of a plastic material which is different from the plastic material forming the rest of the parison. Since use is made of such a composite parison, the resulting hollow product manufactured by blow molding will automatically have locally differing characteristics even without locally thickening or thinning the resulting product.

In accordance with the principle of the present invention, a hollow product of any desired shape can be manufactured, for example, by the application of a blow molding technique advantageously. For example, illustrative products which can be advantageously manufactured in accordance with the present invention include automobile parts, such as arm rests, head rests, knee pads, console boxes, lids for console boxes and glove boxes, pillar garnishes, rear spoilers and pads for steering wheels; chairs; attache cases and cases for musical instruments; toilet seats; tool boxes; and cooler boxes. In these applications, in accordance with the principle of the present invention, since use is made of a composite parison which is different in composition at least partly, there can be provided a product which includes a relatively soft plastic material at a section contacted by a human body and a relatively hard plastic material at the remaining section so as to provide a sufficient rigidity for mounting to a fixed object, such as a frame of an automobile. A product resulting from such a composite parison thus may have a sufficient shape holding characteristic, thereby providing an enhanced security and easiness in mounting the product to a fixed object, such as a frame, and at the same time a sufficient flexibility at a desired section of the product.

In the case of an application to a duct for use in an automobile air-conditioning system, it is desirous to manufacture the duct including a plastic material high in heat-resistant characteristic, such as nylon, at a section which is placed under direct influence of heat from an engine and another plastic material without high heat-resistant characteristic, and, thus, a cheap material, at the remaining section of the product. Moreover, in accordance with the principle of the present invention, if a high wear-resistant characteristic is required for a particular section of a plastic product because it is brought into contact with a metal object, such as a frame, such a product having a locally reinforced section can be easily manufactured using a composite parison in accordance with the present invention.

It is therefore a primary object of the present invention to obviate the disadvantages of the prior art as described above and to provide an improved method and apparatus for manufacturing a hollow product.

Another object of the present invention is to provide an improved method and apparatus for manufacturing a hollow plastic product having a locally different characteristic.

A further object of the present invention is to provide an improved method and apparatus for manufacturing a plastic product having any locally desired characteristic by blow molding.

A still further object of the present invention is to provide an improved method and apparatus for manufacturing a plastic product of any desired shape and characteristic at high efficiency and with increased integrity.

A still further object of the present invention is to provide a plastic product which is manufactured from a single parison and yet has a locally different characteristic.

A still further object of the present invention is to provide a plastic hollow product having a composite structure.

Other objects, advantages and novel features of the present invention will become apparent from the following detailed description of the invention when considered in conjunction with the accompanying drawings.

BRIEF DESCRIPTION OF THE DRAWINGS

FIG. 7 is a table showing the degree of affinity between two resin materials for use in forming a composite parison.

DESCRIPTION OF THE PREFERRED EMBODIMENTS

Figure 1:
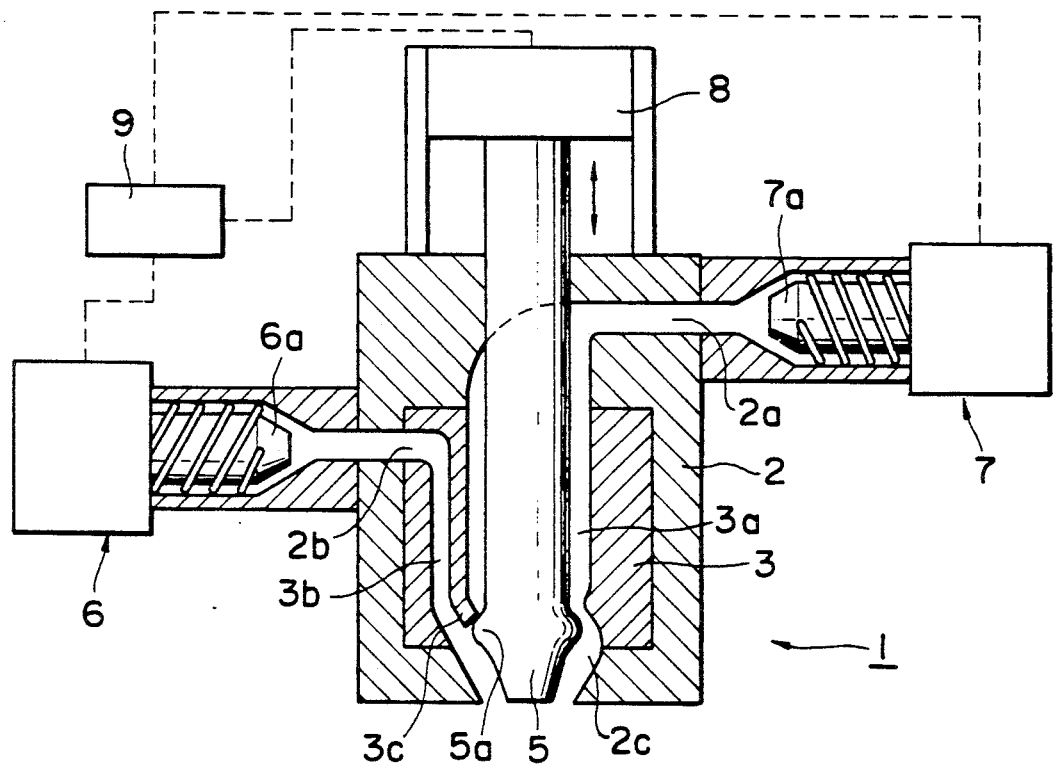
FIG. 1 is a schematic illustration showing a blow molding apparatus constructed in accordance with one embodiment of the present invention.
Figure 3:
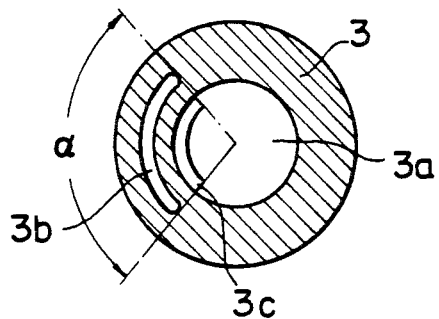
FIG. 3 is a schematic illustration showing in transverse cross section the die 3 provided in the apparatus of FIG. 1.

Referring to FIG. 1, there is schematically shown a parison extruding device 1 for use in a hollow plastic molding apparatus constructed in accordance with one embodiment of the present invention. As shown, the present device 1 includes a nozzle 2 for extruding a parison therefrom and a die 3 mounted inside of the nozzle 2. The nozzle 2 is provided with a first supply port 2a to which a first plastic material is supplied, a second supply port 2b to which a second plastic material is supplied and a discharge port 2c from which a parison is extruded out of the nozzle 2. The first supply port 2a is in communication with the discharging port 2c through a first passage 3a extending through the die 3, and the second supply port 2b is in communication with the discharging port 2c through a second passage 3b which also extends through the die 3 and which is separate from the first passage 3b. In the illustrated embodiment, as shown more clearly in FIG. 3, the die 3 is cylindrical in shape and the first passage 3a is basically defined by a central hollow portion of the die 3 and the second passage 3b is defined in the body of the die 3 in the form of a channel arcuate in cross-sectional shape, subtending an angle alpha. The die 3 is also provided with an inwardly bent projection 3c at the bottom thereof where the second passage 3b merges into the first passage 3a to lead into the discharging port 2c. The projection 3c in the illustrated embodiment also subtends the angle alpha.

The parison extruding device 1 also includes a mandrel 5 as extending through the nozzle 2 and thus the die 3 mounted in the nozzle 2. A circumferential ridge 5a is formed near the bottom end of the mandrel 5. In the illustrated embodiment, the ridge 5a is shown to be a circumferential, continuous ridge; however, it is not necessary for the ridge 5a to be circumferentially continuous by all means. The ridge 5a may take any desired shape as long as part of the mandrel 5 comes into contact with the projection 3c of the die 3 to plug the first passage 3a partially when the mandrel 5 is located at its upper position as shown in FIG. 1. Thus, in fact, the first passage 3a is defined by a gap between the mandrel 5 and an assembly of the nozzle 2 and the die 3. The top portion of the mandrel 5 is connected to a position controlling unit 8 which, for example, is comprised of a cylinder actuator, so that the mandrel 5 may move up and down as indicated by the arrow in both directions within and relative to the assembly of the nozzle 2 and the die 3.

Figure 2:
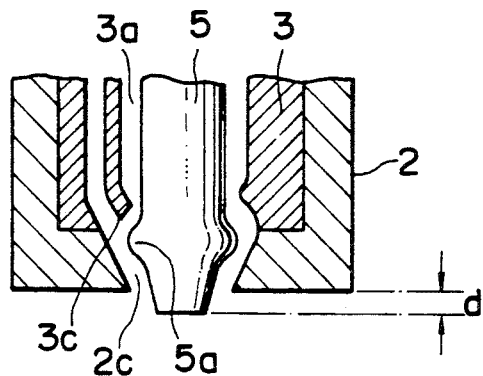
FIG. 2 is a schematic illustration showing part of the apparatus shown in FIG. 1 and also showing the condition in which the mandrel 5 is located at its lower position.

FIG. 1 illustrates the condition in which the mandrel 5 is located at its upper position. Under this condition, the ridge 5a of the mandrel 5 is in contact with the projection 3c of the die 3, and, as a result, the first passage 3a annular in cross section is partially closed over the angle alpha. On the other hand, FIG. 2 shows the condition in which the mandrel 5 is located at its lower position, so that the bottom end of the mandrel 5 extends below the bottom end of the nozzle 2 over a distance d. Under this condition, the ridge 5a of the mandrel 5 is located separated away from the ridge 3c, and, therefore, the first passage 3a annular in cross section is not closed even partially, whereby the entire annular section of the first passage 3a is in communication with the discharging port 2c. In the illustrated embodiment, it is to be noted that the second passage 3b remains in communication with the discharging port 2c and is not plugged or closed even partially irrespective of whether the mandrel 5 is located at its upper position shown in FIG. 1 or at its lower position shown in FIG. 2.

As shown in FIG. 1, the parison extruding device 1 also includes a first supply unit 7 for supplying a first plastic material into the first passage 3a through the first supply port 2a. The first supply unit 7 includes an auger screw 7a which is driven to rotate so as to supply the first plastic material stored in a hopper (not shown) into the first supply port 2a. Similarly, the parison extruding device 1 also includes a second supply unit 6 for supplying a second plastic material into the second passage 3b through the second supply port 2b. The second supply unit 6 is also provided with an auger screw 6a which is driven to rotate in order to supply the second plastic material stored in another hopper (not shown) into the second supply port 2b. In addition, there is also provided a controller 9 for controlling the overall operation of the present device 1, and the controller 9 is operatively connected to the position controlling unit 8 and also to the first and second supply units 6 and 7 so as to control the operation thereof. For example, the controller 9 is preferably comprised of a microprocessor or central processing unit.

Figure 4:
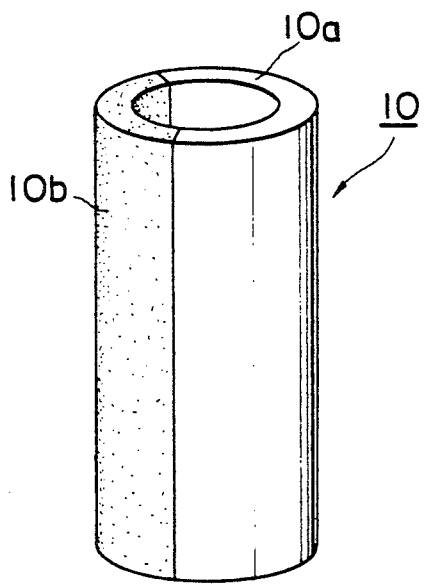
FIGS. 4 through 6 are schematic illustrations showing a few examples of a composite parison which can be produced by the apparatus shown in FIG. 1.

In operation, when the first and second supply units 6 and 7 are driven into operation in accordance with commands from the controller 9 with the mandrel 5 maintained at its upper position as indicated in FIG. 1, the first plastic material is passed through the first supply port 2a and the first passage 3a to the discharging port 2c from the first supply unit 7. On the other hand, the second plastic material is passed through the second supply port 2b and the second passage 3b to the discharging port 2c from the second supply unit 6. In this case, since the first passage 3a annular in cross section is closed over the angle alpha due to a contact between the ridge 5a of the mandrel 5 and the projection 3c of the die 3, the second plastic material is supplied to the discharging port 2c over the angle of alpha, so that there is obtained a composite parison including the first portion comprised of the first plastic material and the second and remaining portion comprised of the second plastic material extruded out of the discharging port 2c. The resulting composite parison 10 thus obtained is shown in FIG. 4. The composite parison 10 is cylindrical in shape and it includes a first arcuate section 10b comprised of the second plastic material over the angle alpha and a second and remaining arcuate section 10a comprised of the first plastic material. Thus, the composite parison 10 is an integrated single parison, but it differs in composition along its circumferential direction.

The composite parison 10 thus obtained is then placed in a mold cavity which is typically defined by bringing a pair of mold halves into mating contact. Then, a pressurized gas, typically compressed air, is introduced into the composite parison placed in the mold cavity to carry out blow molding, thereby producing a hollow plastic product having a desired shape. After cooling, the mold halves are opened by separation to take the molded plastic product out of the mold cavity. In this instance, since the composite parison 10 includes two sections 10a and 10b different in composition, i.e., the first section 10a comprised of the first plastic material and the second section 10b comprised of the second plastic material, there can be obtained a final plastic product having locally different characteristics as desired. For example, in the case when an automobile part, such as a knee pad, is to be manufactured as a hollow plastic product in accordance with the present invention, for that portion of the knee pad which will be contacted by a human body when in use, selection may be made of a relatively soft material, for example, for the second plastic section 10b while selecting a relatively hard material for the first plastic section 10a. With this structure, the resulting hollow plastic product as the knee pad will have the second section which is adequately soft for contact with the human body and the first section which is rigid enough to be used as a mounting portion for mounting to a fixed object, such as a frame of an automobile.

Figure 5:
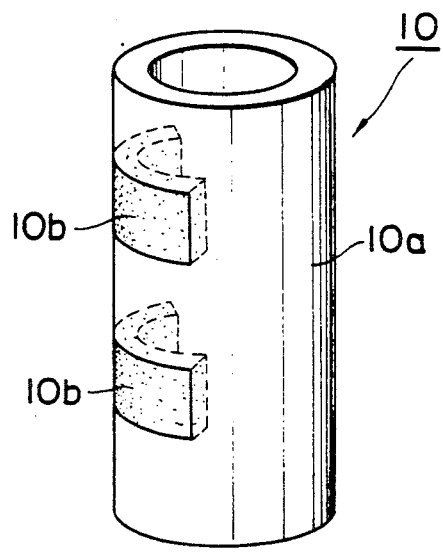
Figure 6:
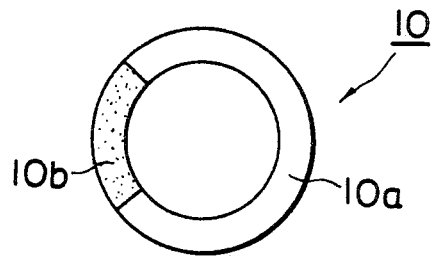

Now, a description will be had with respect to the operation of the present device 1 for producing a composite parison 10 having the structure shown in FIG. 5. The composite parison 10 of this example includes a generally cylindrical main section 10a comprised of a first plastic material and a plurality (two in the illustrated example) of second patchy sections 10b, 10b comprised of a second plastic material. Also in this case, as best shown in FIG. 6, each of the patchy sections 10b, 10b is provided over a predetermined angle (alpha in the illustrated example) along the circumference of the cylindrical main section 10a. In the case of producing the composite parison 10 shown in FIG. 5, the mandrel 5 of the present device 1 is moved to its lower position as shown in FIG. 2 in accordance with a command from the controller 9 to set the first passage 3a in a completely open condition in an annular shape along the circumferential direction. Then, in accordance with another command from the controller 9, only the first supply unit 7 is driven while keeping the second supply unit 6 inoperative, thereby causing the first plastic material to be supplied into the first passage 3a. As a result, the first plastic material passes through the completely open first passage 3a and then is discharged out of the device 1 through the discharging port 2c, so that there is discharged a cylindrical parison which is completely comprised of the first plastic material.

After the parison comprised of the first plastic material has been extruded over a predetermined length, the mandrel 5 is moved upward to its upper position indicated in FIG. 1 in accordance with another command from the controller 9, thereby closing the first passage 3a partially over the angle alpha through contact between the ridge 5a of the mandrel 5 and the inward projection 3c. At the same time, in accordance with a further command from the controller 9, the second supply unit 6 is set into operation, so that the second plastic material is supplied into the second passage 3b through the second supply port 2b. As a result, the second plastic material is supplied to the discharging port 2c over the angle alpha so that the patchy section 10b comprised of the second plastic material as shown in FIG. 5 is formed in the extruded composite parison. After the composite parison has been extruded over another predetermined angle corresponding to the length of the patchy section 10b in the longitudinal direction of the parison 10, a still further command is supplied from the controller 9 to halt the operation of the second supply unit 6. And, at the same time, the mandrel 5 is again moved downward to its lower position indicated in FIG. 2. By repeating the above-described steps of operation, there is obtained a composite parison 10 shown in FIG. 5. Also in this case, the resulting composite parison 10 is placed in a mold cavity and then blow molded to produce a hollow plastic product of any desired shape.

FIG. 7 illustrates a table showing the degree of affinity between two plastic materials which may be used to form a composite parison 10 in accordance with the present invention. It should be noted that combinations of materials shown in FIG. 7 are only illustrative in nature and the present invention is applicable to any other combinations of materials. In addition, combinations of three or more materials are also envisaged within the scope of the present invention.

As described above, in accordance with the present invention, there can be obtained a plastic product having a locally different characteristic out of a single parison. The resulting plastic product has an enhanced integrity and increased scope of shape selection. The composite parison is basically cylindrical in shape and may be made uniform in thickness, so that it can be applied to the conventional blow molding technique to produce a plastic product of any desired shape without any difficulty. Moreover, the parison extruding device of the present invention is relatively simple in structure and thus easy to manufacture. It is to be noted that only one inward projection 3c is provided in the above-described embodiment; however, such a projection 3c may be provided at a plurality of locations in the circumferential direction. Although, only two passages 3a and 3b are provided in the above-described embodiment, three or more passages may be provided, in which case three or more different materials may be supplied to define a composite parison. The plastic material used here includes thermoplastic resins, such as polypropylene, polyethylene, styrene, urethane and elastomers. In addition, the resulting plastic product may be divided into two or more parts, in which case the final product may not be hollow.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for forming a single-layer composite parison which is a hollow cylinder and having at least one circumferential portion along a part of a length of the cylinder having a different composition than the rest of the cylinder, comprising:
   providing a first passage leading to a discharging port, substantially in an annular shape, said first passage being connected to a whole circumference of said annular discharging port or to a part of said discharging port excepting a predetermined circumferential portion thereof selectively;
   providing a second passage leading to said predetermined circumferential portion of said discharging port; and
   supplying a first plastic material to said first passage during which step a second plastic material is supplied to said second passage for a predetermined time, wherein said first passage is connected to the whole circumference of said discharging port when said second plastic material is not supplied and said first passage is connected only to the part of said discharging port when said second plastic material is supplied.

2. The method of claim 1, wherein first and second plastic materials are different in characteristic.

3. The method of claim 2, wherein either one of said first and second plastic materials is relatively soft and the other is relatively hard.

4. A method of forming a single-layer composite parison which is a hollow cylinder and having at least one circumferential portion along a part of a length of the cylinder having a different composition than the rest of the cylinder, comprising:
   a first step of providing a pair of first and second passages each of which leads to a discharging port which is substantially annular in shape;
   a second step of supplying a first plastic material to said first passage; and
   a third step subsequent to said second step of supplying a second plastic material to said second passage for a predetermined time while maintaining the supply of said first plastic material to said first passage, during which predetermined time an annular connection between said first passage and said discharging port is closed only at a predetermined circumferential portion of said connection, and wherein at times other than the predetermined time no portion of said discharging port is closed at said connection.

5. A method for forming a single-layer composite parison different in composition in a circumferential direction at least at a point along a longitudinal axis of said parison, comprising:
   a first step of providing a pair of first and second passages each of which leads to a discharging port;
   a second step of supplying a first plastic material to said first passage;
   a third step of supplying a second plastic material to said second passage;
   a fourth step of temporarily holding said third step inoperative for a predetermined time period; and
   a fifth step of partially closing said first passage except during said predetermined time period in which said third step is held inoperative.

6. An apparatus for forming a single-layer composite parison different in composition in a circumferential direction at least at a point along a longitudinal axis of said parison, comprising:
   a pair of first and second passages each of which leads to a discharging port;
   first means for supplying a first plastic material to said first passage;
   second means for supplying a second plastic material to said second passage;
   means for temporarily holding said second means inoperative for a predetermined time period; and
   means for partially closing said first passage temporarily during said predetermined time period in which said second means is held inoperative.

7. The device of claim 6 further comprising a main body, in which said first and second passages are formed, and a mandrel which extends within said first passage along part thereof, said mandrel being movable along its longitudinal axis between a first position, where said first passage is partially closed by said closing means, and a second position, where said first passage is not partially closed by said closing means, and being provided with a ridge which defines part of said closing means.

8. The device of claim 7 wherein said main body includes an inward projection projecting into said first passage over a predetermined distance, said projection being contactable with said ridge of said mandrel when said mandrel is located at said first position, whereby said first passage is partially closed by an amount determined by a contact between said ridge and said projection.

9. The device of claim 6 further comprising controlling means connected to said first and second supplying means and also to said closing means for controlling the operation of each of said first and second supplying means and said closing means.

* * * * *